United States Patent [19]

Polak et al.

[11] Patent Number: 4,705,545

[45] Date of Patent: * Nov. 10, 1987

[54] THIN FILM POLYMER BLEND MEMBRANES

[75] Inventors: Anthony J. Polak, Lake Zurich; Sandra Petty-Weeks, Naperville, both of Ill.

[73] Assignee: UOP Inc., Des Plaines, Ill.

[ * ] Notice: The portion of the term of this patent subsequent to Sep. 2, 2003 has been disclaimed.

[21] Appl. No.: 765,097

[22] Filed: Aug. 13, 1985

Related U.S. Application Data

[63] Continuation-in-part of Ser. No. 617,054, Jun. 1, 1984, abandoned.

[51] Int. Cl.$^4$ ............................................. B01D 13/00
[52] U.S. Cl. ..................................... 55/158; 210/490; 264/185
[58] Field of Search ............................ 264/185, 232; 210/500.2, 654, 490, 491; 55/16, 158

[56] References Cited

U.S. PATENT DOCUMENTS

| | | | |
|---|---|---|---|
| 4,071,454 | 1/1978 | Yamamoto et al. | 210/500 M |
| 4,264,676 | 4/1981 | Uzumaki et al. | 264/232 X |
| 4,500,667 | 2/1985 | Polak et al. | 524/406 |
| 4,609,468 | 9/1986 | Cramm | 210/490 |

*Primary Examiner*—Frank Spear
*Attorney, Agent, or Firm*—Thomas K. McBride; John F. Spears, Jr.; Raymond H. Nelson

[57] ABSTRACT

Gas separation membranes comprising an inorganic compound-organic polymer blend may be prepared by admixing an organic polymer such as poly(vinyl alcohol) with a phosphoric acid or sulfuric acid in a mutually miscible solvent. After allowing the mixture to proceed for a period of time sufficient to form a blend, the solution may be cast on an appropriate casting surface and, after the solvent has been evaporated, the desired membrane which may have a thickness of from about 0.1 to about 100 microns, is recovered.

19 Claims, No Drawings

THIN FILM POLYMER BLEND MEMBRANES

CROSS REFERENCE TO RELATED APPLICATION

This application is a continuation-in-part of copending application Ser. No. 617,054 filed June 1, 1984, now abandoned, all teachings of which are incorporated herein by reference thereto.

BACKGROUND OF THE INVENTION

Semipermeable membranes may be used for a wide variety of separations involving liquid-liquid separations, liquid-liquid solid separations and gas-gas separations. The membranes which are employed for these purposes usually comprise various organic polymers or mixtures of organic polymers either alone or supported on a porous backing material. For example, semipermeable membranes which are used in desalination processes can comprise cellulose acetate polymers composited on a porous support which acts as a backing for the membrane, thin film composite membranes comprising polymeric compounds such as polyethyleneimine, epiamine, polyethylene, polypropylene films also composited on a porous support such as a polysulfone member, etc. Likewise, gaseous separation membranes may comprise polymeric membranes of cellulose nitrate or cellulose acetate support membranes having a polymer such as dimethylsilicone and styrene, composited thereon, as well as thin film membranes such as polymethylpentene polymers. In addition to these membranes other permselective membranes such as heteropoly acids may be employed for separating gases such as hydrogen from mixtures of gases in a gaseous stream.

Some prior patents have shown certain polymeric compositions which are useable in various processes. For example, U.S. Pat. No. 4,071,454 discloses a hollow fiber which is useful for dialysis. However, a dialysis membrane which comprises a plurality of poly(vinyl alcohol) fibers is substantially different from the polymer blends of the present invention in which the latter may be used for a gas-separation. The fiber membranes which have been disclosed in this patent cannot and will not separate a gas inasmuch as they are utilized to physically absorb a whole molecule, that is, the undissociated molecule in the polymer, and subsequently moving said whole molecule through the polymer under the influence of an osmotic pressure gradient. In this respect, the polymer membrane is very similar in nature to a desalination membrane. In like manner, U.S. Pat. No. 4,264,676 discloses superfine fibers of the poly(vinyl alcohol) type which are prepared by baking these superfine fibers in the presence of a dehydration catalyst which may comprise ammonium polyphosphate, phosphoric acid, ammonium phosphate salts and hydrogen chloride. However, the presence of these dehydration catalysts does not provide a membrane of the type of the present invention but is present in the process to cross-link the poly(vinyl alcohol). This occurs through the phosphate ester with the elimination of water.

As will hereinafter be shown in greater detail, the thin film polymer blend membrane of the present invention will be used in a gas separation process. The polymeric material will transport an ion such as a proton through the membrane in a charge transport reaction. In order to ultimately transport a molecule of hydrogen from one side of this membrane to the other, two protons must be formed. The protons are formed by dissociation of molecular hydrogen on a suitable electrode and the transfer of the resulting protons through the membrane and the corresponding electrons through an external circuit. The membranes which were taught in the two previously mentioned patents do not dissociate the molecule but merely provide a means of transporting the nondissociated molecules through the membrane. In other words, the membranes of the patents are moving individual ions from one side to another through the membrane where the ions and electrons, which are supplied by an external circuit, are recombined, on a suitable catalyst, to form molecular hydrogen.

In a majority of cases in prior work, an admixture of an organic compound, especially in a polymeric state, with an inorganic compound, results in a phase separation due to the fact that the two systems are immiscible in nature. However, we have now discovered that a thin film macroscopically homogeneous polymer blended membrane may be fabricated by admixing a phosphoric acid or sulfuric acid with an organic polymer which is at least partially compatible with said acid to form a polymer blended composition of matter which may be utilized as a membrane in a gas-separation process. It was totally unexpected that a thin film membrane could be cast from such blends to provide a membrane which would be highly conductive to protons and therefore find a use in separations involving generation of a proton as in the case of hydrogen.

BRIEF SUMMARY OF THE INVENTION

This invention relates to compositions of matter which may be used as gas-separation membranes. More specifically, the invention is concerned with a novel macroscopically homogeneous thin film polymer blend membrane which is useful in gas-separation processes, especially those involving the separation of hydrogen.

A conventional operation for separating certain gases from a gas stream containing a mixture of gases whereby a desired gas may be separated and recovered involves the use of membranes which possess a high permeability to the molecular form of the desired gas such as oxygen, hydrogen, nitrogen, etc. These membranes, especially in the case of hydrogen, possess a high permeability to hydrogen whereby molecular hydrogen is transported from the high pressure side of the device, through the membrane and emerges as molecular hYdrogen on the low pressure side. Alternatively, separation of gases may be attained by dissociating the desired gas on the high pressure side and transporting it as an ion through the membrane followed by recombining the ions on the low pressure side. Therefore, à desirable membrane for hydrogen separation should possess excellent protonic conductivity properties. As will hereinafter be shown in greater detail, we have now discovered that membranes which contain both organic and inorganic components will possess this desired property and therefore may be used as hydrogen sensors, hydrogen separation devices, as well as a solid state thin film electrolyte.

It is therefore an object of this invention to provide novel polymeric membranes which are useful in gas-separation devices.

A further object of this invention is to provide a method for preparing organic-inorganic membranes of a type hereinafter set forth in greater detail, said membranes being utilized in gas-separation devices.

In one aspect, an embodiment of this invention resides in a macroscopically homogeneous thin film polymer blend gas-separation membrane which comprises from about 1% to about 70% by weight of an acid selected from the group consisting of phosphoric acids and sulfuric acid and from about 30% to about 99% by weight of a polymer or copolymer of a compound which possesses repeat units selected from the group consisting of hydroxyethylene, vinyl fluoride, ethyleneimine, acrylic acid, ethylene glycol, cellulose acetate, polyphenolic structures such as phenol formaldehyde resins, acrylamide, N-isopropylacrylamide, N,N-dimethylacrylamide, 4-pyridylethylene, vinyl sulfonic acid, N-pyrrolidonylethylene and polymers of 2-ethyl-2-oxazoline, wherein said membrane posseses a thickness in the range of from about 0.1 to about 100 microns.

Another embodiment of this invention resides in a method for the preparation of a macroscopically homogeneous thin film polymer blend gas-separation membrane which comprises: (a) dissolving from about 1% to about 70% by weight of an acid selected from the group consisting of phosphoric acids and sulfuric acid and from about 30% to about 99% by weight of a polymer or copolymer of a compound which possesses repeat units selected from the group consisting of hydroxyethylene, vinyl fluoride, ethyleneimine, acrylic acid, ethylene glycol, cellulose acetate, polyphenolic structures such as phenol formaldehyde resins, acrylamide, N-isopropylacrylamide, N,N-dimethylacrylamide, 4-pyridylethylene, vinyl sulfonic acid, N-pyrrolidonylethylene and vinyl pyrrolidonepolymers of 2-ethyl-2-oxazoline, in a mutually miscible solvent at mixing conditions for a time sufficient to form a macroscopically homogeneous blend; (b) casting said macroscopically homogeneous blend on a smooth casting surface to form a blend on said surface; (c) removing said solvent from said blend; and (d) recovering said macroscopically homogeneous thin film polymer blend membrane.

A specific embodiment of this invention resides in a macroscopically homogeneous thin film polymer blend membrane which comprises a blend of orthophosphoric acid and poly(vinyl alcohol), said acid being present in an amount in the range of from about 1% to about 70% by weight of said blend and said poly(vinyl alcohol) being present in an amount in the range of from about 99% to about 30% by weight of said blend.

Another specific embodiment of this invention is found in a method for the preparation of a macroscopically homogeneous thin film polymer blend membrane which comprises homogeneous thin film polymer blend membrane which comprises dissolving orthophosphoric acid and poly(vinyl alcohol) in water at a temperature in the range of from about ambient to about 100° C. for a period of time sufficient to form a blend, casting said blend on a casting surface, removing said water by evaporation and recovering the resultant thin film membrane.

Other objects and embodiments will be found in the following further detailed description of the present invention.

DETAILED DESCRIPTION OF THE INVENTION

As hereinbefore set forth, the present invention is concerned with blended membranes comprising a macroscopically homogeneous thin film of an organic-inorganic blend as well as to a method for the preparation thereof. As was previously discussed, by attempting to blend an organic polymer with an inorganic compound, the usual result has been to obtain a phase separation. In contradistinction to this, it has now been discovered that a macroscopically homogeneous blend system may be obtained by admixing certain organic polymeric compounds with a phosphoric acid or sulfuric acid, the resulting composition of matter forming a thin film membrane which may be utilized in gas separation systems. The use of these membranes in gas separation devices is due in some respect to the fact that the resulting membrane possesses a high protonic conductivity, especially at room or ambient temperature. The membranes which are formed from the blend of the organic polymer and the acid possess excellent transport properties and operate below the glass transition temperature of the homopolymer. The physical properties which these thin film membranes exhibit thus provide an attractive base for their use as gas sensors, especially in the case of hydrogen, or as gas separation membranes.

Usually high ionic conductivity is observed in polymer complexes only when the temperature is above their glass transition temperature (Tg), that is, above the temperature at which the circumstance changes from a glass to a rubber (the melting point of a polymer is usually above its glass transition temperature). Indications of a change of a polymer from a glass to a rubber are abrupt changes in certain properties such as coefficient of expansion and heat capacity. The polymer blend composites of the present invention exhibit high protonic conductivity at temperatures well below the observed glass transition temperature of the individual homopolymers. It was noted that the polymer blend of the present invention exhibited a glass transition temperature which occurred at a different value than the glass transition temperature of the polymer itself when it is not mixed with any other circumstance, said glass transition temperature having shifted from one value to another. In addition, at a relatively low temperature, a second order transition is observed, this transition being attributable to the acid. The transition temperature associated with the inorganic component depends on the polymer component in the blend. Thus, it may be appreciated that there is a degree of interaction between the inorganic and organic components, that is, at least some chemical interaction exists between the components. In addition, the blend will be transparent to visible light as well as being uniform in color.

The advantages which are proposed by the polymer blend membranes of the present invention over other organic-inorganic blend membranes lies in the fact that the membranes of the present invention possess ionic resistivities which are four to five orders of magnitude less than the other organic-inorganic polymer blends. Inasmuch as in some electronic devices such as hydrogen sensor devices, it is necessary to measure the output voltage, it will be possible, when utilizing a membrane of the instant invention to use a lower impedance voltage measuring device. By using such a device, it will lower the cost of the package, that is, everything that is required to measure the concentration of hydrogen, and thus will provide a more attractive commercial package due to the lower cost and simplified electronic device. In addition, a device with reduced impedance is less sensitive to electromagnetic interference than a high impedance device. This permits the device to be located in an electrically noisy environment without adversely affecting its performance. The desired membrane comprises a blend of an organic polymer and a phosphoric acid or sulfuric acid, the polymer being at least partially compatible with the acid.

Examples of organic polymers or copolymers which may be employed as one component of the blend of the present invention will include those compounds which possess repeat units and are selected from the group consisting of hydroxyethylene, vinyl fluoride, ethyleneimine, acrylic acid, ethylene glycol, cellulose acetate, polyphenolic structures such as phenol formaldehyde resins, acrylamide, N-isopropylacrylamide, N,N-dimethylacrylamide, 4-pyridylethylene, vinyl sulfonic acid, N-pyrrolidonylethylene and polymers of 2-ethyl-2-oxazoline, etc.

The other component of the organic-inorganic blend will comprise phosphoric acid or sulfuric acid. Examples of phosphoric acids which may be employed will include hypophosphoric acid, metaphosphoric acid, orthophosphoric acid, pyrophosphoric acid, polyphosphoric acid, or aqueous sulfuric acid, which may be present in an amount in the range of from about 10% to about 40% of sulfuric acid in the aqueous solution. It is to be understood that the aforementioned organic polymers and phosphoric acids or sulfuric acid are only representative of the class of components which make up the membrane blend of the present invention, and that said invention is not necessarily limited thereto.

The novel compositions of matter of the present invention are prepared by admixing the two components of the blend in a mutually miscible solvent at solution conditions for a period of time sufficient to form the desired blend. In the preferred embodiment of the invention the mutually miscible solvent which is employed to dissolve the components comprises water, although it is contemplated within the scope of this invention that any other mutually miscible solvent, either inorganic or organic in nature may also be employed. The mixing of the two components of the composition of matter may be effected at solution conditions which will include a temperature in the range of from about ambient (20°-25° C.) up to the boiling point of the mutually miscible solvent which, for example, in the case of water is 100° C. The time of reaction which is necessary to form the desired blend will vary with the particular organic polymers and phosphoric acids or sulfuric acid as well as the solvent and may be within a period of time ranging from about 0.5 up to about 10 hours or more in duration. Upon completion of this period, the blend is cast upon a suitable casting surface which may consist of any suitable material sufficiently smooth in nature so as to provide a surface free of any defects which may cause imperfections on the surface of the membrane. Examples of suitable casting surfaces may include metals such as stainless steel, aluminum, etc., glass, polymer or ceramics. After casting the solution upon the surface, the solvent is then removed by any conventional means including natural evaporation or forced evaporation by the application of elevated temperatures whereby said solvent is evaporated and the desired membrane comprising a thin film of the polymeric blend is formed. In the preferred embodiment of the invention, the polymeric blend of an organic-inorganic compound will possess a molecular weight ranging from about 2000 up to about 135,000 and preferably greater than 10,000. The thickness of the film can be controlled by the amount of phosphoric or sulfuric acid and/or the polymer which is present in the reaction mixture. In this respect, it is to be noted that the ratio of phosphoric or sulfuric acid and organic polymer may vary over a relatively wide range. For example, the phosphoric or sulfuric acid may be present in the blend in a range of from about 1% to about 70% by weight of the blend while the organic polymer may be present in an amount in the range of from about 99% to about 30% by weight of the blend. The thin film organic-inorganic blend which is prepared according to the process of the present invention will possess a thickness which may range from about 0.1 to about 100 microns and preferably from about 5 to about 60 microns.

The polymer blend membranes of the present invention may be prepared by placing a predetermined amount of each of the components of the blend, namely, the organic polymer and the phosphoric acid or sulfuric acid, in an appropriate apparatus such as a flask. After adding the mutually miscible solvent, the mixture is allowed to remain, after thorough admixing thereof, for a predetermined period of time within the range hereinbefore set forth. As an example, poly(vinyl alcohol) and orthophosphoric acid may be placed in a flask and dissolved in water which has been heated to 100° C. Upon completion of the desired residence time, the solution is cast upon an appropriate casting surface and the water or other solvent is removed. The desired and resulting polymer blend membrane is then recovered and utilized in an appropriate gas separation apparatus or gas sensor apparatus.

Examples of novel thin film polymer blends which may be prepared according to the process of this invention will include poly(vinyl alcohol)-orthophosphoric acid, poly(vinyl fluoride)-orthophosphoric acid, cellulose acetate-orthophosphoric acid, polyethylene glycolorthophosphoric acid, poly(vinyl alcohol)-pyrophosphoric acid, poly(vinyl fluoride)-pyrophosphoric acid, cellulose acetate-pyrophosphoric acid, polyethylene glycolpyrophosphoric acid, poly(vinyl alcohol)-metaphosphoric acid, poly(vinyl fluoride)-metaphosphoric acid, polyethylene glycol-metaphosphoric acid, poly(vinyl alcohol)-sulfuric acid, poly(vinyl fluoride)-sulfuric acid, cellulose acetate-sulfuric acid, polyethylene glycol-sulfuric acid, poly(acrylamide)-orthophosphoric acid, poly(acrylamide)-metaphosphoric acid, poly(acrylamide)-sulfuric acid, poly(ethyloxazoline)-orthophosphoric acid, poly(ethyloxazoline)-metaphosphoric acid, poly(ethyloxazoline)-sulfuric acid, poly(N-isopropylacrylamide)-orthophosphoric acid, poly(N-isopropylacrylamide)-metaphosphoric acid, poly(N-isopropylacrylamide)-sulfuric acid, poly(vinyl-4-pyridine)-orthophosphoric acid, poly(vinyl-4-pyridine)-metaphosphoric acid, poly(vinyl-4-pyridine)-sulfuric acid, poly(vinyl pyrrolidone)-orthophosphoric acid, poly(vinyl pyrrolidone)-metaphosphoric acid, poly(vinyl pyrrolidone)-sulfuric acid, etc.

Again, it is to be understood that the aforementioned list of polymer blends is only representative of the class of polymer blended membranes which may be prepared according to the process of this invention and that said invention is not necessarily limited thereto.

The following examples are given for the purpose of illustrating the novel polymer blend membranes and the process for preparing the same. However, it is to be understood that these examples are merely illustrative in nature and that the present invention is not necessarily limited thereto.

EXAMPLE I

A novel polymer blend thin film membrane of the present invention was prepared by dissolving 0.25 gram of poly(vinyl alcohol) and 0.1 mL of 14.7M orthophosphoric acid in boiling deionized water, the amount of poly(vinyl alcohol) and orthophosphoric acid being sufficient to impart a 63/37 wt. % ratio to the resulting polymer blend membrane. The solution was then poured into an evaporating dish and the water was allowed to evaporate for a period of 18 hours. The resulting film was transparent and possessed a thickness of 20 microns. The thin film membrane was cut into a disc having a 1" diameter and platinum electrodes were sputter-dispersed onto both sides of the disc. The electrode material had a thickness ranging from about 200 to 1000 Angstroms with a diameter of about 1 cm. The membrane was then placed into a Teflon holder and electrical contact was made with the electrodes through copper platens. On one side of the membrane the hydrogen pressure of 1 atmosphere was maintained while exposing the working electrode to a blend composed of 10% hydrogen, 90% nitrogen. The results of this test showed a hydrogen flux of about $4 \times 10^{-5}$ cubic feet per square feet per hour and a current density of about $3 \times 10^{-6}$ A/cm$^2$.

The blended film was found to be optically transparent and no phase separation was observed when the film was examined with an optical microscope or SEM. The specimen was also subjected to glass transition temperature measurements inasmuch as the measurement of the glass transition temperature, or temperatures of a polymer blend, is the most commonly used criteria for determining the number of phases present in a blend. For example, a single phase organic-inorganic blend will exhibit a single glass transition temperature between the temperature of the components, while in a two-phase system, two separate temperatures will result. Poly(vinyl alcohol) has a known glass transition temperature of about 71° C. while the boiling temperature of orthophosphoric acid is 213° C. A DSC scan of the film prepared according to the above paragraphs had a peak of about 75° C. while no peaks were observed at temperatures corresponding to the glass transition temperature of poly(vinyl alcohol) and the boiling point of orthophosphoric acid.

Infrared spectroscopy of the film showed strong bands appearing at 2400 cm$^{-1}$, 1020 cm$^{-1}$ and 500 cm$^{-1}$. The indication from this analysis is that the bands are associated with intermolecular bonding between the poly(vinyl alcohol) and the orthophosphoric acid.

EXAMPLE II

An organic polymer- phosphoric acid blend membrane was prepared utilizing a manner similar to that set forth above. The film membrane which contained a 63/37 wt. % blend of poly(vinyl alcohol) and orthophosphoric acid possessed a thickness of about 20 microns and were cut into 1" diameter discs. Electrodes comprising platinum were suptter-dispersed onto both sides of the disc to a thickness of about 400 Angstroms. The membrane was then placed in a similar Teflon cell being positioned in the middle of the cell to render the two sides of the cell air-tight. A reference gas consisting of 100% hydrogen and a working gas comprising 10% hydrogen and 90% nitrogen were placed on each side of the cell. The gases were continuously flushed through the cell, and the output EMF of 29.4 millivolts was generated. This compared to an output of EMF of 0 millivolts when pure hydrogen is present on both sides of the membrane. In addition, the resistivity of the membrane was about $10^4$ ohm-cm.

EXAMPLE III

In this example, a polymer blend membrane was prepared by dissolving poly(vinyl pyrrolidone) and orthophosphoric acid in boiling deionized water, said compounds being present in a mole ratio of 1:1.2 moles of poly(vinyl pyrrolidone) per mole of phosphoric acid. The resulting membrane, after being cast on a glass cloth support, was placed in a Teflon cell similar in nature to that set forth in the above Example. A reference gas consisting of 100% hydrogen and a working gas consisting of 90% nitrogen and 10% hydrogen were placed on each side of the cell. The gases were continuously flushed through the cell and an output EMF of 29.1 mV was generated. A current, after 24 hours, was $7.6 \times 10^{-6}$ amperes and the resistivity was $7.4 \times 10^{+5}$ ohm-cm.

EXAMPLE IV

In this example, a membrane was prepared by admixing equimolar amounts of poly(ethyloxazoline) and orthophosphoric acid, the composition of the final product being 50/50 wt. %. The resulting membrane was tested in a manner similar to that set forth above and an output EMF of 29.2 mV was generated. After 24 hours the current was $2.6 \times 10^{-6}$ amperes and the resistivity was $5.2 \times 10^{+5}$ ohm-cm.

EXAMPLE V

In like manner, other membranes were prepared by admixing poly(acrylamide) and orthophosphoric acid utilizing various amounts of acids. In one case, a 50/50 wt. % mixture of poly(acrylamide) and orthophosphoric acid produced a clear membrane. In like manner, other membranes were prepared by admixing the poly(acrylamide) and phosphoric acid in 40/60 wt. % and 25/75 wt. % of polymer to acid to produce clear membranes.

EXAMPLE VI

Similar polymer blend membranes may be prepared by admixing other organic polymers such as cellulose acetate or poly(vinyl alcohol) with sulfuric acid to form the desired thin film polymer blend membranes which are similar to the membranes described in Examples I and II above and which may possess similar properties.

We claim as our invention:

1. A macroscopically homogeneous thin film polymer blend gas-separation membrane which comprises a solution blend comprising (1) an acid present in an amount in the range of from 1% to 70% by weight of said blend selected from the group consisting of phosphoric acids and sulfuric acid and (2) a component present in an amount in the range of from 30% to 99% by weight of said blend selected from the group consisting of (i) a polymer selected from the group consisting of polyvinyl alcohol, polyvinyl fluoride, polyethyleneimine, polyacrylic acid, polyethylene glycol, cellulose acetate, phenol formaldehyde resins, polyvinyl pyrrolidone, polyethyloxazoline, polyacrylamide, poly(N-isopropyl acrylamide), poly(N,N-dimethyl acrylamide), poly(vinyl 4-pyridiene) and poly(vinyl sulfonic acid); (ii) copolymers having monomer units of the polymers of (i); and (iii) a polymer or copolymer having repeat units selected from the group consisting of 4-pyridylethylene and N-pyrrolidonylethylene wherein said membrane possesses a thickness in the range of from about 0.1 to about 100 microns.

2. The macroscopically homogeneous thin film polymer blend gas-separation membrane as set forth in claim 1 in which said phosphoric acid is orthophosphoric acid.

3. The macroscopically homogeneous thin film polymer blend gas-separation membrane as set forth in claim 1 in which said phosphoric acid is polyphosphoric acid.

4. The macroscopically homogeneous thin film polymer blend gas-separation membrane as set forth in claim 1 in which said phosphoric acid is metaphosphoric acid.

5. The macroscopically homogeneous thin film polymer blend gas-separation membrane as set forth in claim 1 in which said acid comprises orthophosphoric acid and said polymer comprises poly(vinyl alcohol).

6. The macroscopically homogeneous thin film polymer blend gas-separation membrane as set forth in claim 1 in which said acid comprises orthophosphoric acid and said polymer comprises poly(vinyl pyrrolidone).

7. The macroscopically homogeneous thin film polymer blend gas-separation membrane as set forth in claim 1 in which said acid comprises sulphuric acid and said polymer comprises poly(vinyl alcohol).

8. The macroscopically homogeneous thin film polymer blend gas-separation membrane as set forth in claim 1 in which said acid comprises orthophosphoric acid and said polymer comprises poly(ethyloxazoline).

9. The macroscopically homogeneous thin film polymer blend gas-separation membrane as set forth in claim 1 in which said acid comprises orthophosphoric acid and said polymer comprises poly(acrylic acid).

10. A method for the preparation of a macroscopically homogeneous thin film polymer blend gas-separation membrane which comprises the steps of
(a) dissolving from 1% to 70% by weight of an acid selected from the group consisting of phosphoric acids and sulfuric acid and from 30% to 99% by weight of a component selected from the group consisting of (i) a polymer selected from the group consisting of polyvinyl alcohol, polyvinyl fluoride, polyethyleneimine, polyacrylic acid, polyethylene glycol, cellulose acetate, phenol formaldehyde resins, polyvinyl pyrrolidone, polyethyloxazoline, polyacrylamide, poly(N-isopropyl acrylamide), poly(N,N-dimethyl acrylamide), poly(vinyl 4-pyridiene) and poly(vinyl sulfonic acid); (ii) copolymers having monomer units of the polymers of (i); and (iii) a polymer or copolymer having repeat units selected from the group consisting of 4-pyridylethylene and N-pyrrolidonylethylene, in a mutually miscible solvent at solution conditions for a time sufficient to form a macroscopically homogeneous blend;
(b) casting said macroscopically homogeneous blend on a smooth casting surface;
(c) removing said solvent from said blend; and
(d) recovering said macroscopically homogeneous thin film polymer blend membrane.

11. The method as set forth in claim 10 in which said macroscopically homogeneous thin film polymer blend membrane possesses a thickness in the range of from about 0.1 to about 100 microns.

12. The method as set forth in claim 10 in which said mixing conditions include a temperature in the range of from about ambient to about 100° C.

13. The method as set forth in claim 10 in which said mutually miscible solvent is water.

14. The method as set forth in claim 13 in which said removal of said water in step (c) is accomplished by evaporation.

15. The method as set forth in claim 10 in which said acid comprises orthophosphoric acid and said polymer comprises poly(vinyl alcohol).

16. The method as set forth in claim 10 in which said acid comprises orthophosphoric acid and said polymer comprises poly(vinyl pyrrolidone).

17. The method as set forth in claim 10 in which said acid comprises sulfuric acid and said polymer comprises poly(vinyl alcohol).

18. The method as set forth in claim 10 in which said acid comprises orthophosphoric acid and said polymer comprises poly(ethyloxazoline).

19. The method as set forth in claim 10 in which said acid comprises orthophosphoric acid and said polymer comprises poly(acrylic acid).

* * * * *